United States Patent [19]
Burke et al.

[11] Patent Number: 5,899,472
[45] Date of Patent: May 4, 1999

[54] ROLL CONTROL SYSTEM

[75] Inventors: David Burke, Belloy en France; Robin Oakley, Rully; Adam Bach, Vincennes; Jocelyn Marchand, Levallois Perret, all of France

[73] Assignee: Delphi France Automotive Systems, La Garenne-Colombes, France

[21] Appl. No.: 08/883,509

[22] Filed: Jun. 26, 1997

[30] Foreign Application Priority Data

Jul. 12, 1996 [GB] United Kingdom ............... 9614674

[51] Int. Cl.⁶ .................................................. B60G 21/073
[52] U.S. Cl. .................................. 280/124.106; 280/5.506
[58] Field of Search ........................ 280/124.106, 5.506, 280/5.508

[56] References Cited

U.S. PATENT DOCUMENTS

| | | | |
|---|---|---|---|
| 3,606,374 | 9/1971 | Capgras | 280/124.106 |
| 3,980,316 | 9/1976 | Yates | 280/124.106 |
| 4,606,551 | 8/1986 | Toti et al. | 280/124.106 |
| 5,362,094 | 11/1994 | Jensen | 280/124.107 |
| 5,431,431 | 7/1995 | Fulks et al. | 280/5.508 |
| 5,447,332 | 9/1995 | Heyring | 280/124.106 |
| 5,566,970 | 10/1996 | Lin | 280/124.106 |

Primary Examiner—Kenneth R. Rice
Attorney, Agent, or Firm—Jeffrey A. Sedlar

[57] ABSTRACT

A roll control system for a motor vehicle having a vehicle body and a pair of front or rear wheel axles, the roll control system having a first fluid damper pivotally mounted on a wheel axle between the wheel axle and the vehicle body; a first fluid actuator pivotally mounted on the wheel axle between the wheel axle and the vehicle body; a second fluid damper pivotally mounted on the other wheel axle between the other wheel axle and the vehicle body; a second fluid actuator pivotally mounted on the other wheel axle between the other wheel axle and the vehicle body; wherein the first damper has a damping and stiffness compression chamber linked by a first passage to a rebound chamber in the second actuator; wherein the second damper has a damping and stiffness compression chamber linked by a second passage to a rebound chamber in the first actuator; and fluid pressure controller connecting the first passage with the second passage or isolating the first passage from the second passage and operable, during predetermined operating conditions of the vehicle, to allow an increase fluid pressure in at least one of the passages to increase roll stiffness, and to allow an increase in roll damping, substantially simultaneously. Provides roll stiffness during cornering or other driving conditions without the presence of an anti-roll bar.

11 Claims, 12 Drawing Sheets

5,899,472

ROLL CONTROL SYSTEM

TECHNICAL FIELD

The present invention relates to a roll control system for a motor vehicle.

BACKGROUND OF THE INVENTION

Vehicle suspension systems aim to provide good ride and handling performance. This requires isolation from unwanted forces and accelerations generated from road surface inputs whilst maintaining good grip and feedback to the vehicle operator when executing maneuvers. Suspension systems have been obliged to compromise between these requirements. Vehicles traditionally make use of an anti-roll or torsion bar for improving handling at the expense of ride comfort. Removing the anti-roll bar can provide a significant improvement in ride comfort but can lead to unacceptable body roll.

SUMMARY OF THE INVENTION

It is an object of the present invention to overcome this problem.

To this end, a roll control system in accordance with the present invention for a motor vehicle having a vehicle body and a pair of front or rear wheel axles, comprises a first fluid damping means pivotally mountable on one wheel axle and mountable between said one wheel axle and the vehicle body; a first fluid actuating means pivotally mountable on said one wheel axle and mountable between said one wheel axle and the vehicle body; a second fluid damping means pivotally mountable on the other wheel axle and mountable between said other wheel axle and the vehicle body; a second fluid actuating means pivotally mountable on said other wheel axle and mountable between said other wheel axle and the vehicle body; wherein the first damping means has a damping and stiffness compression chamber fluidly linked by a first passage to a rebound chamber in the second actuating means; wherein the second damping means has a damping and stiffness compression chamber fluidly linked by a second passage to a rebound chamber in the first actuating means; fluid in the compression chambers, rebound chambers and passages; and fluid pressure control means fluidly connecting the first passage with the second passage or isolating the first passage from the second passage and operable, during predetermined operating conditions of the vehicle, to allow an increase fluid pressure in at least one of the passages to increase roll stiffness, and to allow an increase in roll damping, substantially simultaneously.

The present invention provides a roll control system for a motor vehicle which does not require the presence of an anti-roll bar, but which provides roll stiffness for acceptable vehicle handling during predetermined operating conditions, such as cornering, and which can remove roll stiffness for improved ride comfort.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
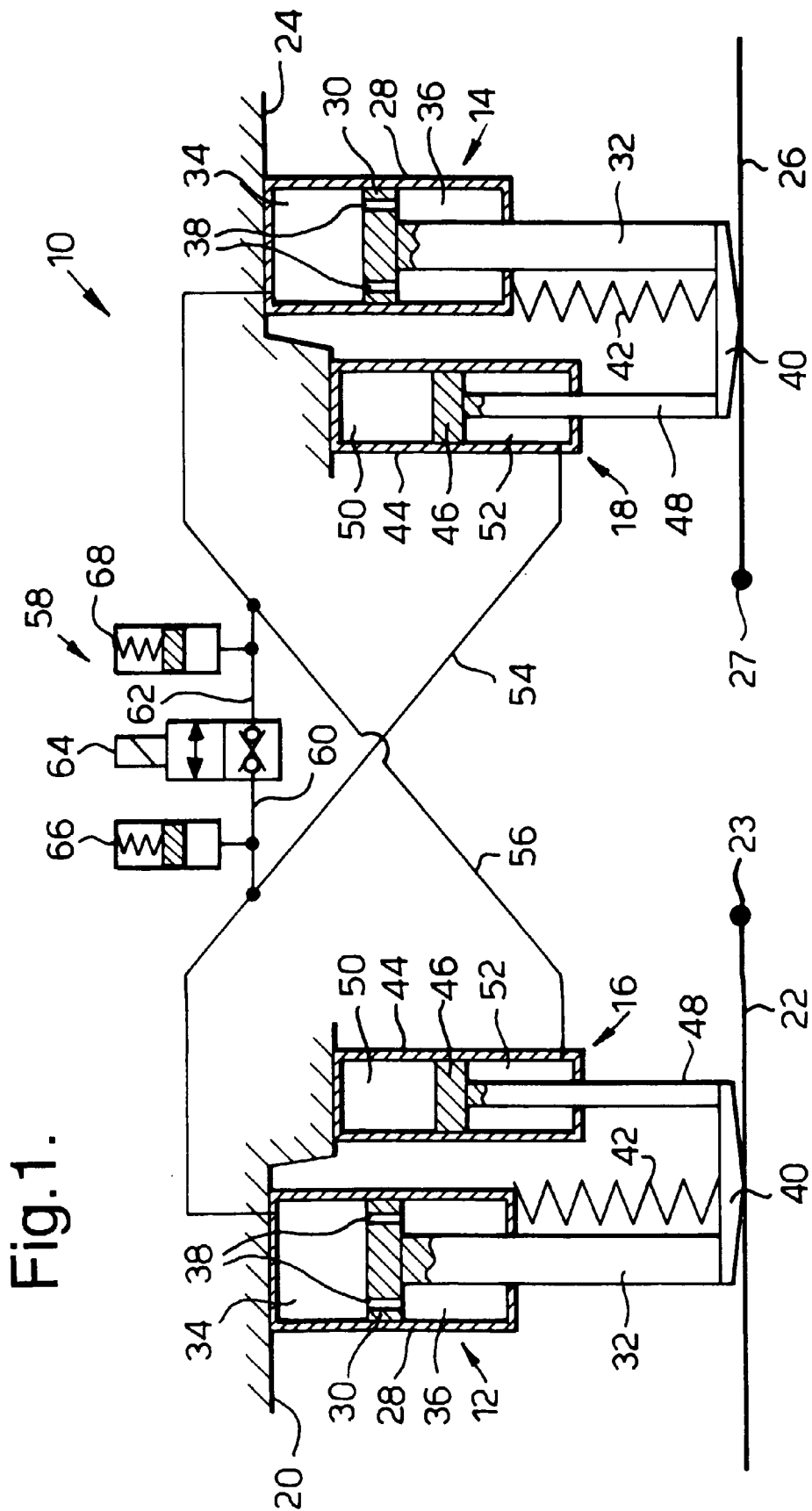
FIG. 1 is a schematic cross-sectional view of a roll control system in accordance with the present invention.

Referring to FIG. 1, the roll control system 10 comprises first and second fluid dampers 12,14 and first and second fluid actuators 16,18 respectively. The first fluid damper and actuator 12,16 are mounted between a portion of the vehicle body 20 and a first wheel axle 22. The second fluid damper and actuator 14,18 are mounted between a portion of the vehicle body 24 and a second wheel axle 26. The wheel axles 22,26 have substantially aligned longitudinal axes (when the vehicle is travelling in a straight line on a substantially flat road surface), are pivotally secured to a portion of the vehicle body at one end 23,27, and have a wheel (not shown) secured thereto at the other end. The first fluid damper 12 comprises a substantially closed cylindrical housing 28, a piston 30 sealably slidably mounted inside the housing, a piston rod 32 secured to the piston and extending out of the housing, a compression chamber 34 on one side of the piston, and a rebound chamber 36 on the other side of the piston, the piston rod extending through the rebound chamber. The chambers 34,36 are substantially filled with hydraulic fluid and are fluidly linked by flow restricting passages 38 through the piston 30, fluid flow being controlled by suitable valves (not shown) in a similar manner to known hydraulic dampers used in the suspension systems of motor vehicles. Alternatively, the damping function may be provided with a different configuration of restrictive valves. In this embodiment, the housing 28 is secured to the portion 20 of the vehicle and the piston rod 32 is secured to a lever 40 which is pivotally mounted on the wheel axle 22. A spring 42 acting between the housing 28 and the lever 40 biases the fluid damper 12 towards an extended position and supports the static weight of the vehicle. The second fluid damper 14 is substantially identical to the first fluid damper 12, and like parts have been given the same reference numeral.

The first fluid actuator 16 comprises a substantially closed cylindrical housing 44, a piston 46 sealably slidably mounted in the housing, a piston rod 48 secured to the piston and extending out of the housing, a compression chamber 50 on one side of the piston, and a rebound chamber 52 on the other side of the piston, the piston rod extending through the rebound chamber. The rebound chamber 52 is substantially filled with hydraulic fluid. The compression chamber 50 is vented to atmosphere. In this embodiment, the housing 44 is secured to the portion 20 of the vehicle and the piston rod 48 is secured to the lever 40. The second fluid actuator 18 is substantially identical to the first fluid actuator 16, and like parts have been given the same reference numeral.

The working compression surface area of the first and second dampers 12,14 is preferably as close as possible to, or substantially the same as, the working rebound surface area of the opposed actuator 18,16. In this embodiment, the cross-sectional area of the piston rod 32 of each damper 12,14 is preferably substantially the same as the surface area of the piston 46 which is exposed to the rebound chamber 52 in each actuator 16,18. If the cross-sectional area of the piston rod 32 is greater than the surface area of the piston 46 which is exposed to the rebound chamber 52, the vehicle will experience some jacking during cornering. If the cross-sectional area of the piston rod 32 is less than the surface area of the piston 46 which is exposed to the rebound chamber 52, the vehicle will experience some lowering during cornering.

The compression chamber 34 of the first damper 12 is fluidly connected by a passage 54 to the rebound chamber 52 of the second actuator 18. Similarly, the compression chamber 34 of the second damper 14 is fluidly connected by a passage 56 to the rebound chamber 52 of the first actuator 16.

Fluid pressure control means 58 links the passages 54,56. The fluid pressure control means 58 comprises a passage 60 fluidly connected to passage 54, a passage 62 fluidly connected to passage 56, a solenoid valve 64 fluidly connecting passages 60 and 62 and operable between an open position and a closed position, a fluid accumulator 66 fluidly connected to passage 60, and a fluid accumulator 68 fluidly connected to passage 62. The fluid accumulators 66,68 may comprise spring biased pistons, as shown, or any other suitable arrangement which is biased to force fluid out of the accumulator. The operation of the solenoid valve 64 is controlled by an electronic control unit (not shown) which, by use of suitable sensors (not shown), determines the correct demand based on vehicle operating conditions, such as the vehicle travelling in a straight line or round a corner. Generally, if the vehicle is travelling in a straight line, the solenoid valve 64 is actuated to an open position to fluidly connect passages 60 and 62, and hence fluidly connect passages 54 and 56. If the vehicle is cornering, the solenoid valve 64 is actuated to a closed position to fluidly isolate the passages 60 and 62, and hence fluidly isolate the passages 54 and 56.

Figure 2:
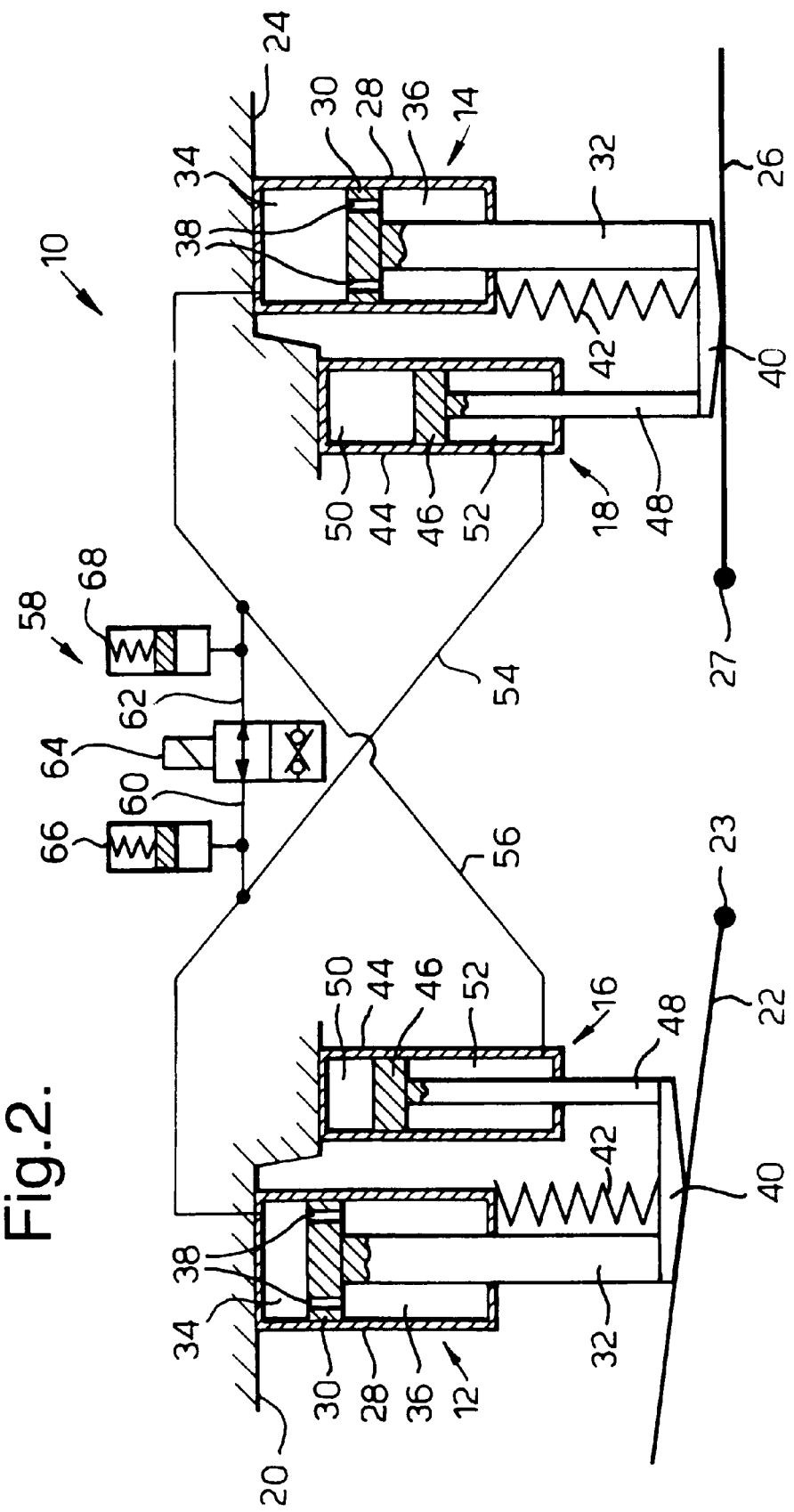
FIG. 2 is a schematic cross-sectional view of the roll control system of FIG. 1 during driving in a straight line on an uneven road surface.

When the solenoid valve 64 is commanded by the electronic control unit to be open (when the electronic control unit determines that ride comfort should be improved), the roll control system 10 is operational as shown in FIG. 2. In this arrangement, hydraulic fluid is free to flow between the compression chambers 34 of the dampers 12,14 and the rebound chambers 52 of the actuators 16,18 by way of the passages 54,56,60,62 irrespective of the condition of the road surface. As a consequence, substantially no roll stiffness from the roll control system is exerted on the vehicle, thereby providing minimal resistance to motion and improving ride comfort (compared to a vehicle having an anti-roll bar).

Figure 3:
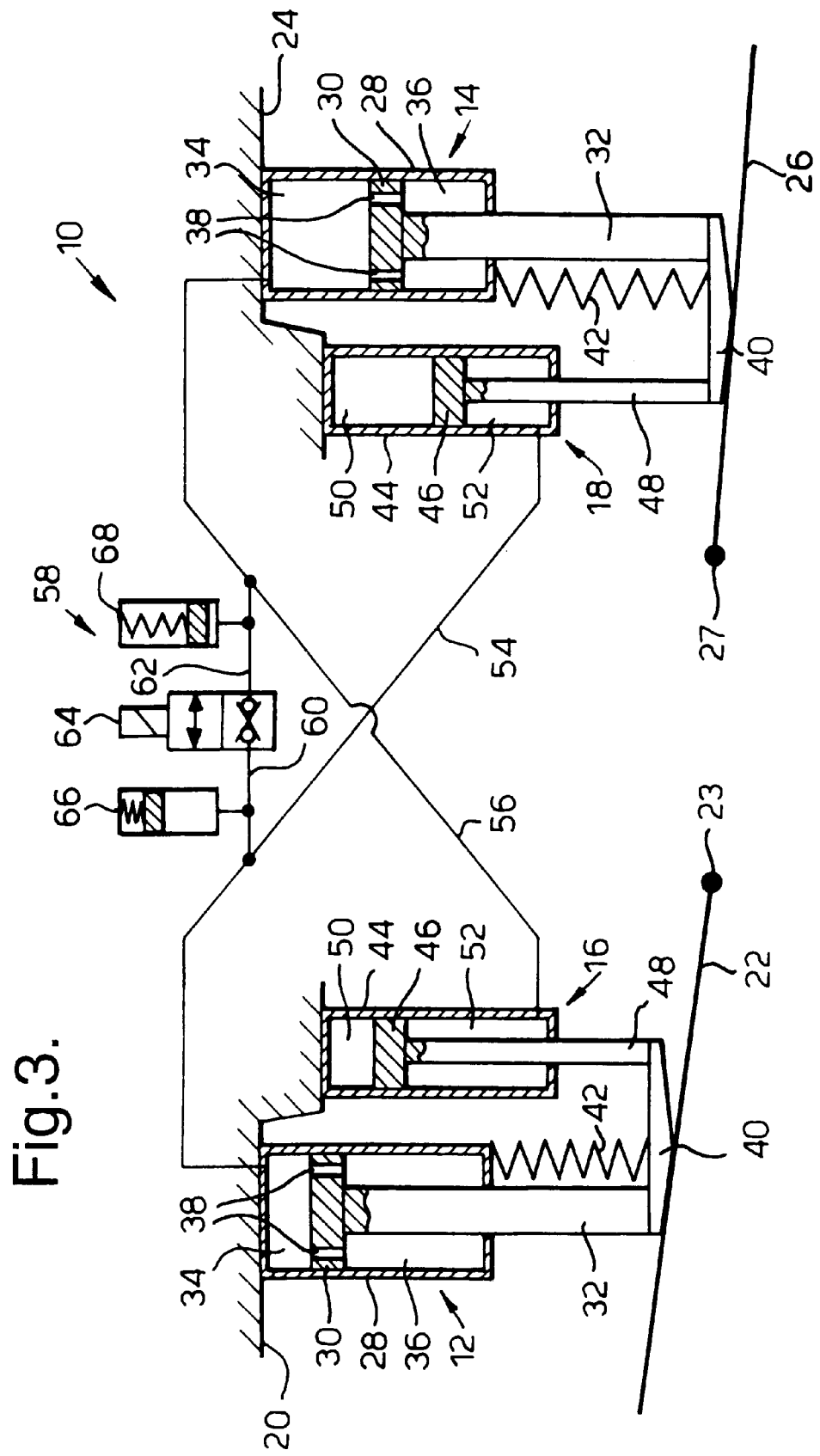
FIG. 3 is a schematic cross-sectional view of the roll control system of FIG. 1 during driving round a corner on a substantially flat road surface.

When the solenoid valve 64 is commanded by the electronic control unit to be closed (when the electronic control unit determines that roll stiffness is required), the roll control system 10 is operational as shown in FIG. 3. In this arrangement, the hydraulic fluid in the compression chamber 34 of the first damper 12 and the rebound chamber 52 of the second actuator 18 is compressed to force fluid into the associated accumulator 66 by way of passages 54 and 60. At the same time, the pressure on the hydraulic fluid in the compression chamber 34 of the second damper 14 and in the rebound chamber 52 of the first actuator 16 is reduced to draw fluid out of the associated accumulator 68 by way of passages 56 and 62. Cornering in the opposite direction has the reverse effect. In these arrangements, the roll control system 10 acts as a traditional anti-roll bar with roll stiffness being provided by the biasing force of the accumulators 66,68.

Figure 4:
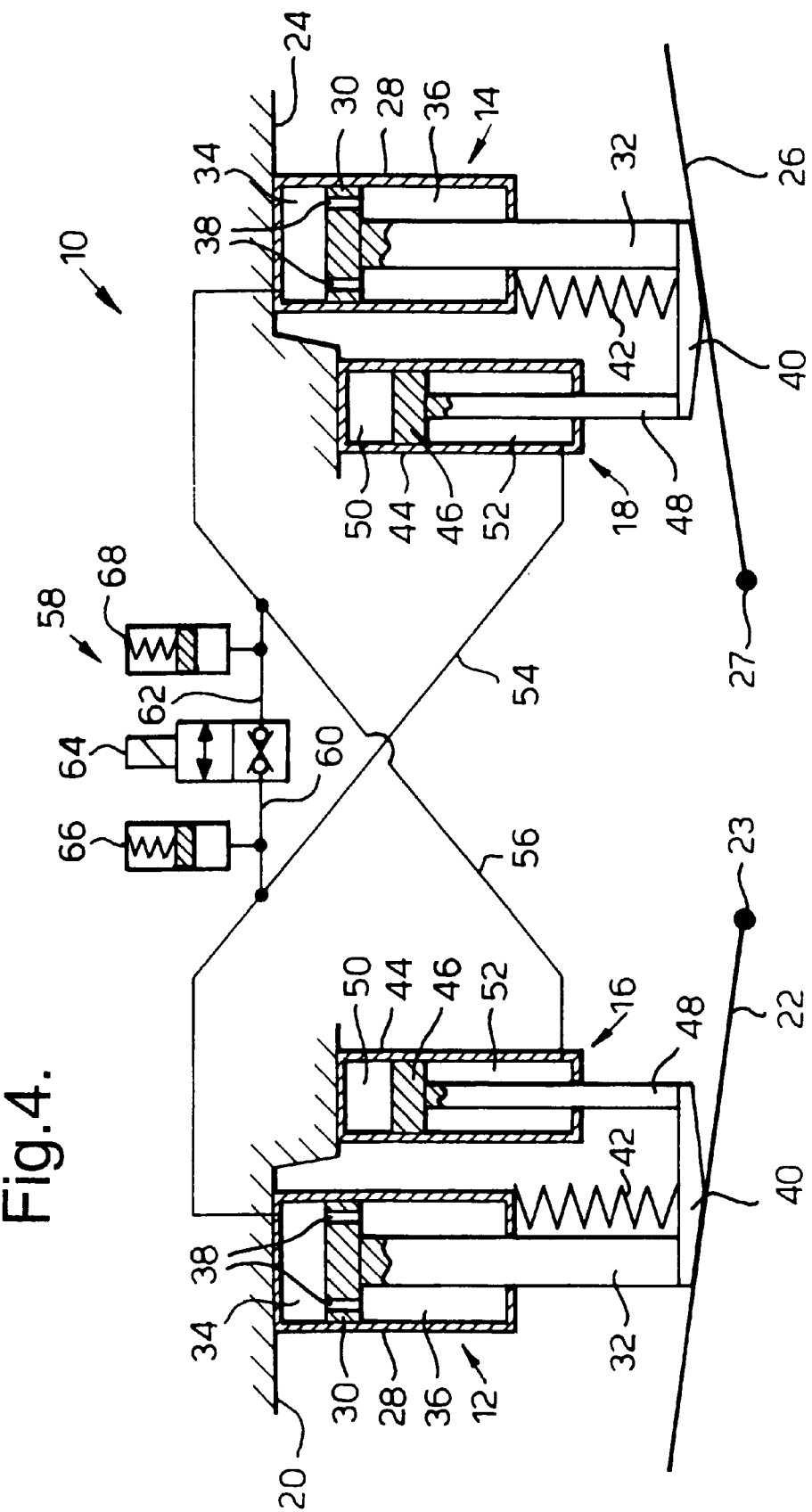
FIG. 4 is a schematic cross-sectional view of the roll control system of FIG. 1 during driving with the circuits isolated and with the wheels experiencing a heave type input.

If, when the solenoid valve 64 is closed (for example, during cornering), the vehicle experiences a heave motion, the roll control system 10 is operational as shown in FIG. 4, with the solenoid valve 64 in a closed position. In this arrangement, the hydraulic fluid in the compression chambers 34 of both dampers 12,14 is transferred to the rebound chambers 52 of the actuators 18,16. Because of the transfer of fluid in this way, no heave stiffness is generated from the system.

Additional sensors (not shown) on the vehicle may also be used to control the operation of the solenoid valve 64 to close the solenoid valve even when the vehicle is travelling in a straight line. This would provide roll stiffness for straight line motion of the vehicle. Such an arrangement may be desirable, if, for example, the roll control system fails, or the vehicle is subjected to strong side winds, or for other reasons. The present invention is therefore not restricted to providing roll stiffness only during cornering of the motor vehicle, but is operational to provide roll stiffness on other occasions, as determined during motion of the vehicle.

Figure 5:
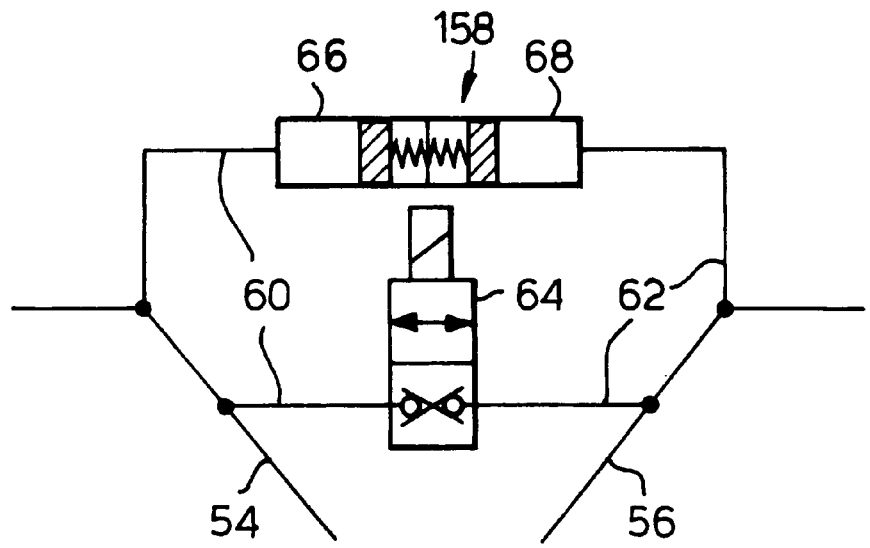
FIG. 5 is a schematic view of a first alternative form of fluid pressure control means of the roll control system of FIG. 1.
Figure 6:
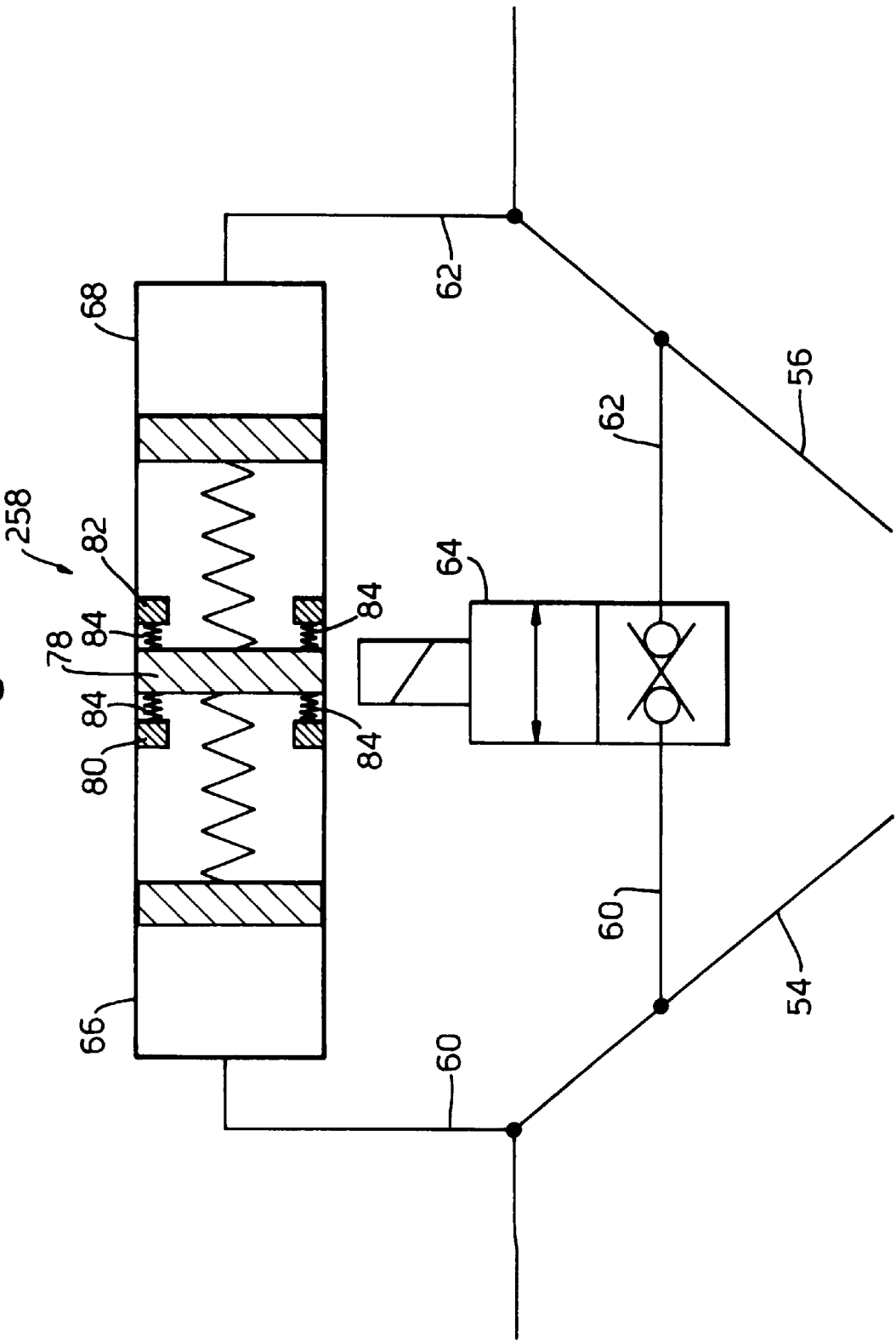
FIG. 6 is a schematic view of a second alternative form of fluid pressure control means of the roll control system of FIG. 1.

In a modification of the above, as shown in FIG. 5, the accumulators 66,68 of the fluid pressure control means 158 are joined together in a common housing. A modification to this arrangement is shown in FIG. 6 in which the joined accumulators 66,68 of the fluid pressure control means 258 have a floating wall 78 therebetween. The floating wall 78 is axially movable between a pair of stops 80,82 and is biased to a central position by springs 84. Using this latter arrangement, the roll control system provides a comfort zone before the system is fully locked for roll control.

Figure 7:
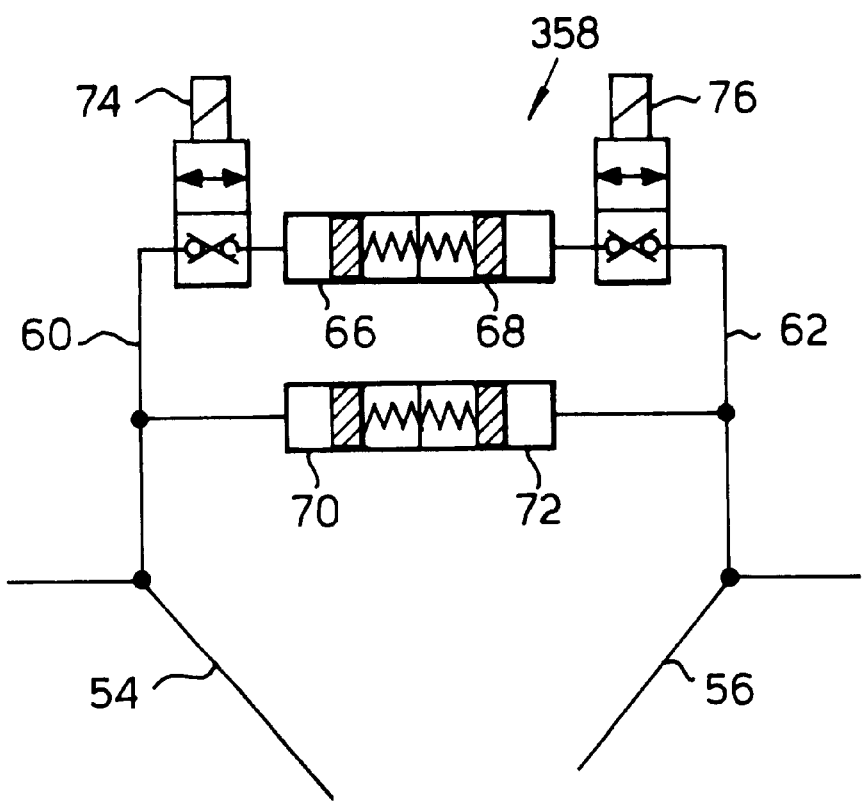
FIG. 7 is a schematic view of a third alternative form of fluid pressure control means of the roll control system of FIG. 1.

In a further modification, the sole solenoid valve is omitted and replaced by second pair of accumulators 70,72, and a first open/closed solenoid valve 74 is placed in the passage 60 between the passage 54 and the associated accumulator 66, and a second open/closed solenoid valve 76 is placed in the passage 62 between the passage 56 and the associated accumulator 68, as shown in FIG. 7. This latter arrangement of the fluid pressure control means 358 will provide limited roll stiffness when the solenoid valves 74,76 are open and all the accumulators 66–72 are operating, and a second level of roll stiffness during cornering (when the solenoid valves 74,76 are closed and only the accumulators 70,72 are operating). In order to keep fluid pressure equalisation between each half of the system, a fluid bypass passage with a restriction orifice therein may be placed around the accumulators 66,68 of the FIG. 7 arrangement.

In an alternative embodiment, the housings 28,44 of the dampers 12,14 and actuators 16,18 may be secured to the levers 40 and the piston rods 32,48 secured to the portions 20,24 of the vehicle. In a further embodiment, the levers 40 may be omitted and the dampers 12,14 and actuators 16,18 directly pivotally mounted on the wheel axles 22,26.

The above described arrangements could be modified by replacing the vent to atmosphere for the compression chambers 50 of the actuators 16,18, and connecting these compression chambers to a pumped gas system. Such an arrangement could provide a levelling system for the vehicle. Additionally or alternatively, with the solenoid valve 64 closed, fluid may be pumped (by any suitable means) into the passage 54 or the passage 56 to generate a moment across the wheel axles 22,26 to provide active roll control, that is, to reduce roll angles in cornering below those provided by the accumulator generated roll stiffness.

Due to modified flow paths when the passages 54,56 are isolated or connected by the solenoid valve 64, the system can generate, and be tuned hydraulically to give, two different levels of damping in order to enhance suspension performance. As an example, a flow restriction may be placed in the passage into each accumulator 66,68 as an additional level of roll damping when the passages 54,56 are isolated.

In the above described arrangements, the solenoid valve may be replaced by a proportional valve to provide a controllable level of roll stiffness in straight line driving up to full roll stiffness when required to do so, for example, for a certain cornering angle. Alternatively, the solenoid valve could be replaced by any electrically operated flow control valve. The valve may be a spool valve or a poppet valve. Also, the accumulators 66,68 may have a "blow-off" feature to provide two levels of roll stiffness during cornering—an additional higher level of roll stiffness may be required during certain cornering maneuvers. This "blow-off" feature may be provided within a single accumulator, or may require a pair of accumulators connected to each passage 60,62, and may be provided by the use of a pre-charged accumulator.

Figure 8:
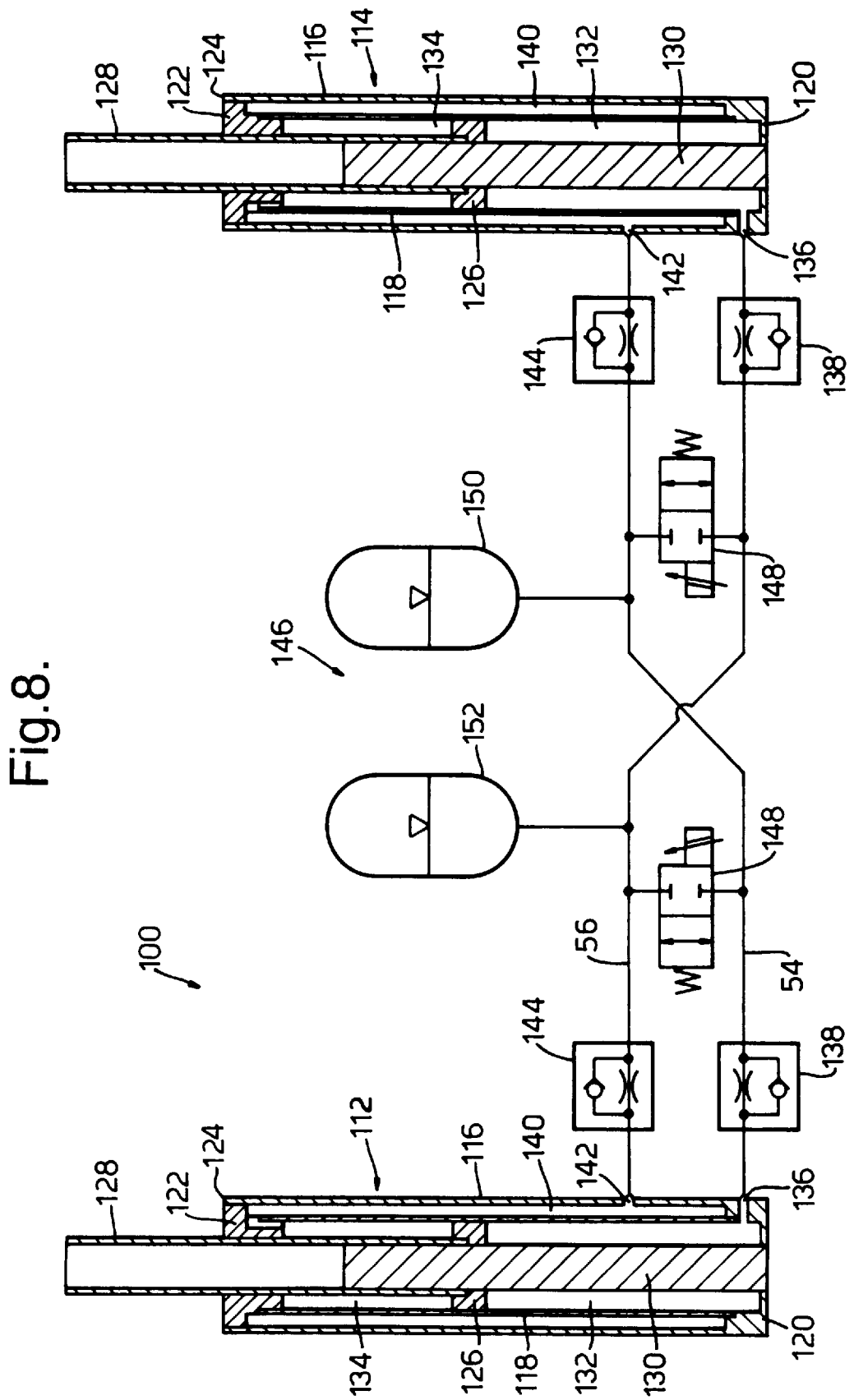
FIG. 8 is a schematic cross-sectional view of a second embodiment of roll control system in accordance with the present invention.

The housings 28,44 for the first damper 12 and first actuator 16 may be integrated in a single body, and similarly for the housings of the second damper 14 and second actuator 18. In a preferred arrangement, the first damper and the first actuator may have a common compression chamber and/or a common rebound chamber, and, similarly, the second damper and the second actuator may have a common compression chamber and/or a common rebound chamber. Examples of this arrangement are shown in FIGS. 8 to 12. Configurations of this type have compression and rebound chambers separated or isolated by means of a solid piston. In FIG. 8, the roll control system 100 comprises a first combined damper and actuator 112 and a second combined damper and actuator 114. The combined damper and actuator 112 comprises an outer tube or housing 116 and a coaxial inner tube 118. The outer tube 116 is closed at one end 120 and has an annular insert 122 at the other end 124. A piston 126 is slidably positioned within the inner tube 118. The piston 126 is connected to an axially extending tubular rod 128 which extends through the annular insert 122 and makes a sealing sliding fit therewith. The tubular rod 128 and piston assembly 126 also makes a sealing sliding fit with an axially extending solid rod 130 which is connected to the closed end 120 of the outer tube 116. The space between the solid rod 130 and the inner tube 118 defines a compression chamber 132, and the space between the tubular rod 128 and the inner tube defines a rebound chamber 134. The compression chamber 132 is connected to the passage 54 by way of an exit port 136 in the outer tube 216 and a damping or flow restricting valve 138. The rebound chamber 134 is connected to the passage 56 by way of the chamber 140 between the inner and outer tubes 118,116, an exit port 142 in the outer tube, and a damping or flow restricting valve 144. The second combined damper and actuator 14 is substantially identical to the first combined damper and actuator 112 and like parts have been given the same reference numeral. As can be seen, the passage 54 fluidly connects the compression chamber 132 of the first combined damper and actuator 112 with the rebound chamber 134 of the second combined damper and actuator 114. Similarly, the passage 56 fluidly connects the compression chamber 132 of the second combined damper and actuator 114 with the rebound chamber 134 of the first combined damper and actuator 112. The compression chamber 132, rebound chamber 134 and the damping valves 138,144 define a damper, and the compression chamber and the rebound chamber define an actuator, of the combined damper and actuator 112,114. The fluid pressure control means 146 comprises two solenoid valves 148 and two membrane accumulators 150, 152. The solenoid valves 148 are connected across the passages 54,56 as shown, with one accumulator 150 connected to one passage 54 and the other accumulator 152 connected to the other passage 56. The use of two solenoid valves 148 as opposed to one helps to reduce fluid motion in the system. The working compression surface area of the first and second dampers is preferably as close as possible to the working rebound surface area of the opposed actuator. In a preferred arrangement, the surface area of the piston 126 exposed to the rebound chamber 134 is as close as possible to the surface area of the piston exposed to the compression chamber 132. When the solenoid valves 148 are open, the roll control system 100 will provide improved ride comfort as described above with respect to the roll control system 10 of FIGS. 1 to 4, and when the solenoid valves 148 are closed, the roll control system 100 will provide roll stiffness also as described above. The effects on roll control are substantially the same as those described above with respect to FIGS. 1 to 4. The damping valves 138,144 may be integrally mounted in the associated housing 116.

Figure 9:
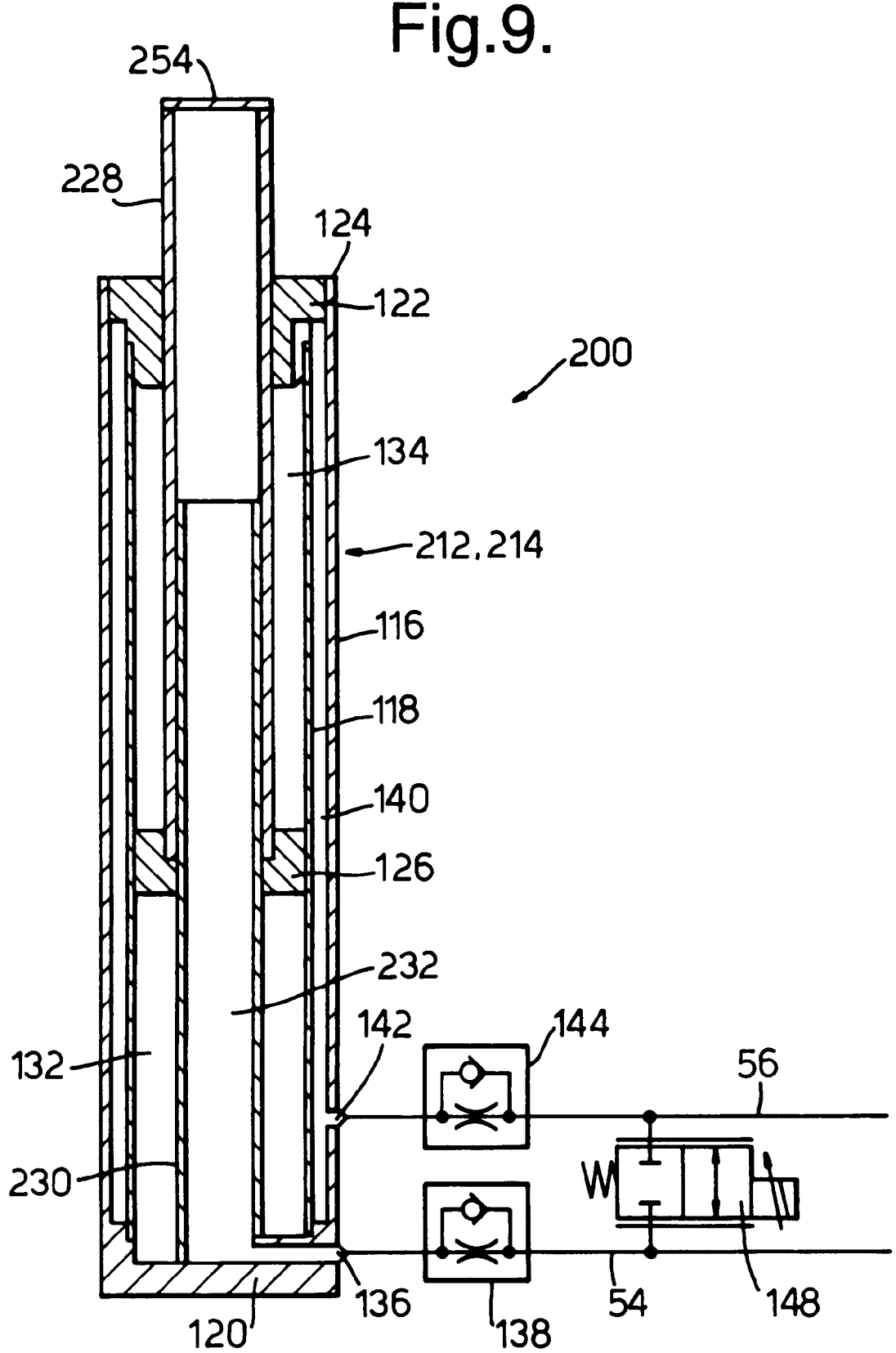
FIG. 9 is a schematic cross-sectional view of one half of a third embodiment of roll control system in accordance with the present invention.

The roll control system 200 of FIG. 9 is substantially identical to the roll control system 100 of FIG. 8 with a modified version of the combined dampers and actuators 212,214. In this arrangement, the tubular rod 228 is closed at its free end 254, and the solid rod is replaced by a tubular rod 230. The tubular rods 228,230 define, internally, a compression chamber 232 which is connected to the exit port 136 in the outer tube 116. The compression chamber 132 is isolated from the both orifice 136 and the compression chamber 232, and provides an optional volume for levelling control. If not used for levelling control, the compression chamber 132 is vented to atmosphere. In this arrangement, the compression chamber 232, rebound chamber 134 and the damping valves 138,144 define a damper, and the compression chamber 232 and the rebound chamber 134 define an actuator, of the combined damper and actuator 212,214. In this configuration, the surface area of the piston 126 exposed to the rebound chamber 134 can be configured to have substantially the same surface area the cross-sectional area of the tubular rod 230, as mentioned above for the FIG. 1 embodiment.

Figure 10:
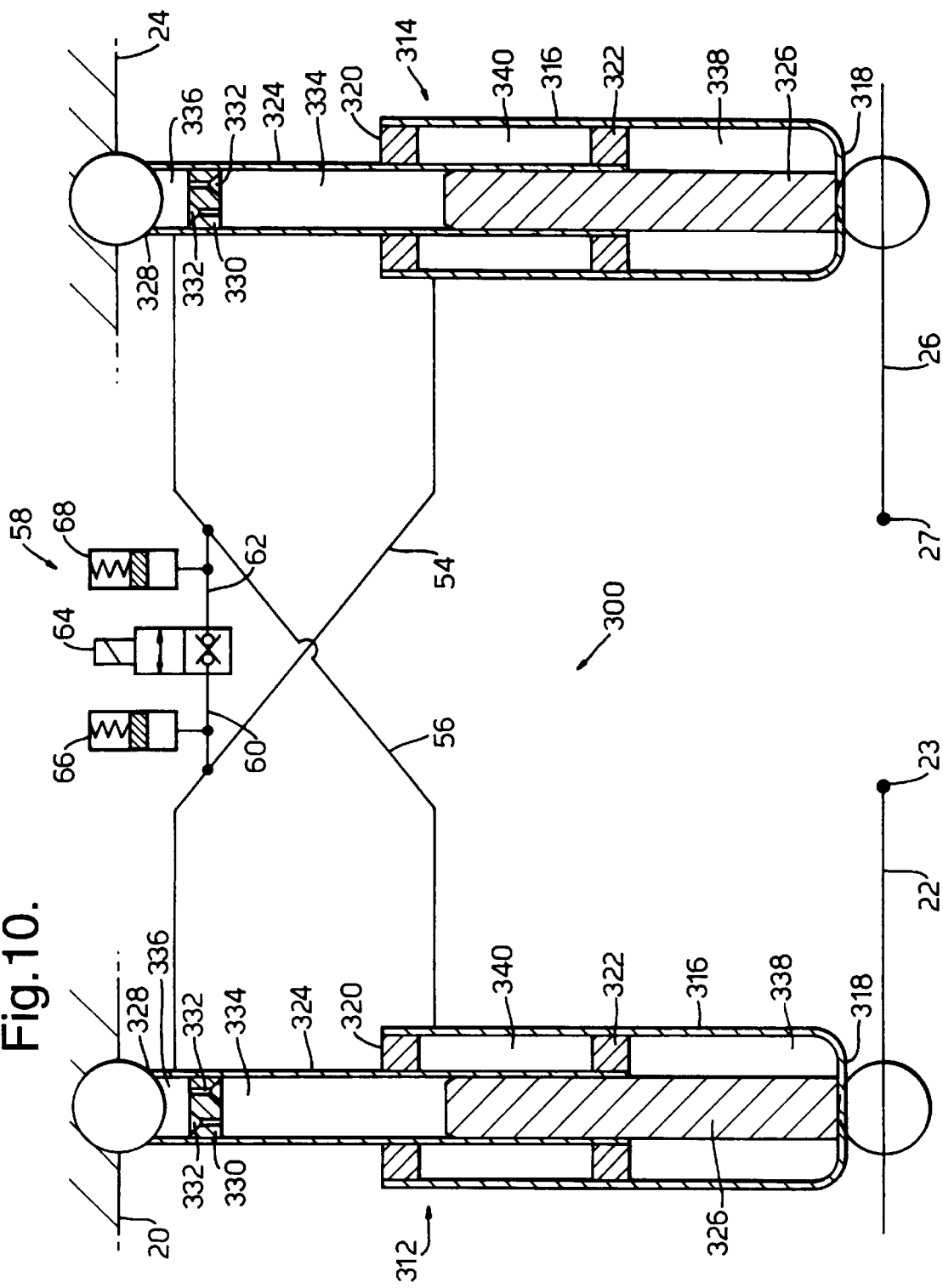
FIG. 10 is a schematic cross-sectional view of a fourth embodiment of roll control system in accordance with the present invention.
Figure 11:
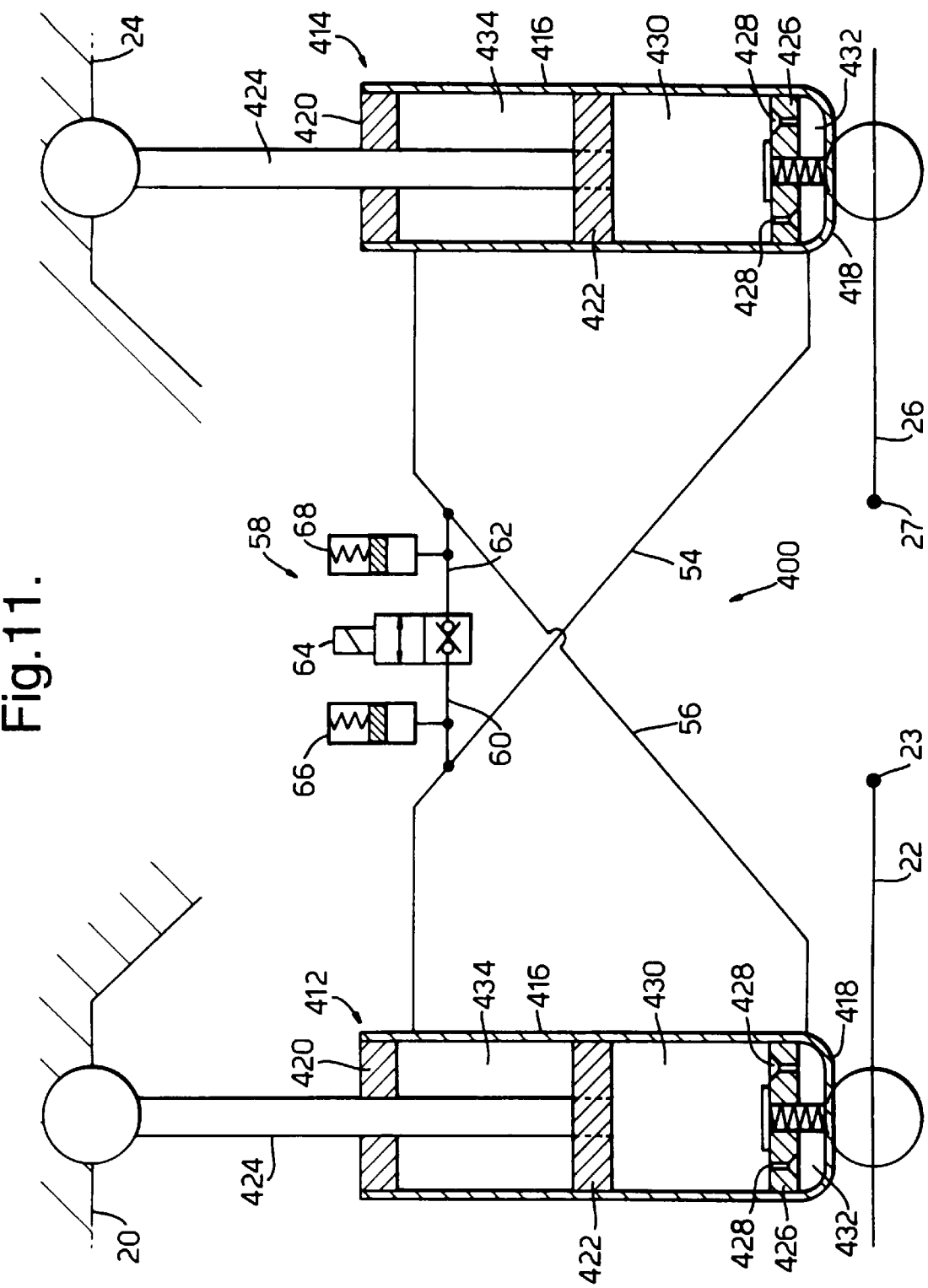
FIG. 11 is a schematic cross-sectional view of a fifth embodiment of roll control system in accordance with the present invention.

The roll control system 300 of FIG. 10 is a modified version of the roll control system 10 of FIG. 1. In this arrangement, each combined damper and actuator 312,314 comprises a tubular housing 316 which is closed at one end 318, and which has an annular insert 320 at the other end. A piston 322 is slidably mounted inside the housing 316. The piston 322 is attached to a tubular rod 324 which extends through, and makes a sealing sliding fit with, the annular insert 320. The tubular rod 324 makes a sliding fit on a solid rod 326 which is secured to the closed end 318 of the housing 316. The tubular rod 324 is closed at its free end 328. An insert 330 is secured inside the tubular rod 324 adjacent the free end 328. The insert 330 has damping or flow restricting orifices 332 therethrough. The space between the insert 330 and the solid rod 326 inside the tubular rod 324 defines a compression chamber 334 which connects with an additional chamber 336 inside the tubular rod by way of the orifices 332. The space between the piston 322 and the closed end 318 of the housing 316 inside the housing defines a compression chamber 338. Compression chamber 338 provides an optional volume for levelling control. If not used for levelling, the compression chamber 338 may be vented to atmosphere. The space between the piston 322 and the annular insert 320 inside the housing 316 defines a rebound chamber 340. The rebound chamber 340 of the combined damper and actuator 312 and the additional chamber 336 of the combined damper and actuator 314 are fluidly connected by way of passage 56. The rebound chamber 340 of the combined damper and actuator 314 and the additional chamber 336 of the combined damper and actuator 312 are fluidly connected by way of passage 54. The fluid pressure control means 58 is substantially the same as that shown in FIG. 1, and its operation is as described above. In this arrangement, the compression chamber 334, rebound chamber 340 and damping orifices 332 act as the damper of each combined damper and actuator 312,314, and the compression chamber 334 and rebound chamber 340 act as the actuator of each combined damper and actuator. In a preferred arrangement, the cross-sectional area of the solid rod 326 is substantially the same as the surface area of the piston 322 exposed to the rebound chamber 340, as in the FIG. 1 embodiment The roll control system 400 of FIG. 11 is a modification of the roll control system 300 of FIG. 10. In this arrangement, each combined damper and actuator 412,414 comprises a tubular housing 416 which is closed at one end 418 and which has an annular insert 420 at the other end. A piston 422 is slidably mounted inside the housing 416. The piston 422 is attached to a rod 424 which extends through, and makes a sealing sliding fit with, the annular insert 420. An insert 426 is secured inside the housing 416 adjacent the closed end 418. The insert 426 has damping or flow restricting orifices 428 therethrough. The space between the insert 426 and the piston 422 inside the housing 416 defines a compression chamber 430 which connects with an additional chamber 432 inside the housing 416 by way of the orifices 428. The space between the piston 422 and the annular insert 420 inside the housing 416 defines a rebound chamber 434. The rebound chamber 434 of the combined damper and actuator 412 and the additional chamber 432 of the combined damper and actuator 414 are fluidly connected by way of passage 54. The rebound chamber 434 of the combined damper and actuator 414 and the additional chamber 432 of the combined damper and actuator 412 are fluidly connected by way of passage 56. The fluid pressure control means 58 is substantially the same as that shown in FIG. 1, and its operation is as described above. In this arrangement, the compression chamber 430, rebound chamber 434 and damping orifices 428 act as the damper of each combined damper and actuator 412,414, and the compression chamber 430 and rebound chamber 434 act as the actuator of each combined damper and actuator. In a preferred arrangement, the cross-sectional area of the rod 424 is made as small as practicable to bring the working surface area of each side of the piston 422 as close as possible to each other.

Figure 12:
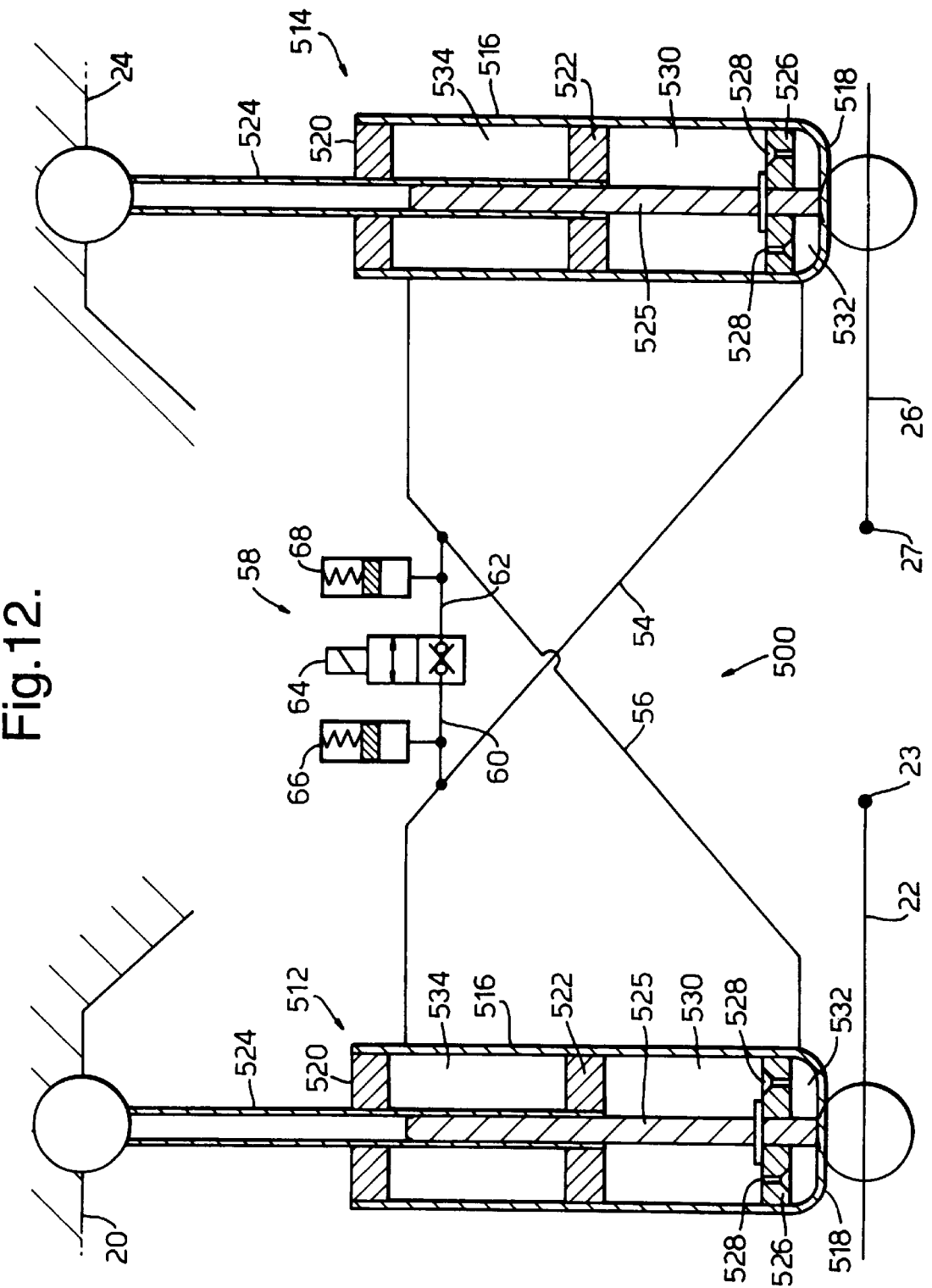
FIG. 12 is a schematic cross-sectional view of a sixth embodiment of roll control system in accordance with the present invention.

The roll control system 500 of FIG. 12 is a modification of the roll control system 400 of FIG. 11. In this arrangement, each combined damper and actuator 512,514 comprises a tubular housing 516 which is closed at one end 518 and which has an annular insert 520 at the other end. A piston 522 is slidably mounted inside the housing 516. The piston 522 is attached to a tubular rod 524 which extends through, and makes a sealing sliding fit with, the annular insert 520. The tubular rod 524 makes a sliding fit on a solid rod 525 which is secured to the closed end 518 of the housing 516. An insert 526 is secured inside the housing 516 adjacent the closed end 518. The insert 526 has damping or flow restricting orifices 528 therethrough. The space between the insert 526 and the piston 522 inside the housing 516 defines a compression chamber 530 which connects with an additional chamber 532 inside the housing 516 by way of the orifices 528. The space between the piston 522 and the annular insert 520 inside the housing 516 defines a rebound chamber 534. The rebound chamber 534 of the combined damper and actuator 512 and the additional chamber 532 of the combined damper and actuator 514 are fluidly connected by way of passage 54. The rebound chamber 534 of the combined damper and actuator 514 and the additional chamber 532 of the combined damper and actuator 512 are fluidly connected by way of passage 56. The fluid pressure control means 58 is substantially the same as that shown in FIG. 1, and its operation is as described above. In this arrangement, the compression chamber 530, rebound chamber 534 and damping orifices 528 act as the damper of each combined damper and actuator 512,514, and the compression chamber 530 and rebound chamber 534 act as the actuator of each combined damper and actuator. In a preferred arrangement, the surface area of the piston 522 exposed to the rebound chamber 534 is as close as possible to the surface area of the piston exposed to the compression chamber 530.

The alternative arrangements of fluid pressure control means shown in FIGS. 5 to 7 could also be used with any of the roll control systems shown in FIGS. 8 to 12. Any of the alternative arrangements described above with reference to the roll control system of FIGS. 1 to 4, can be used, where appropriate, with any of the roll control systems of FIGS. 8 to 12. In certain circumstances, the hydraulic fluid may be replaced by compressed gas.

Figure 13:
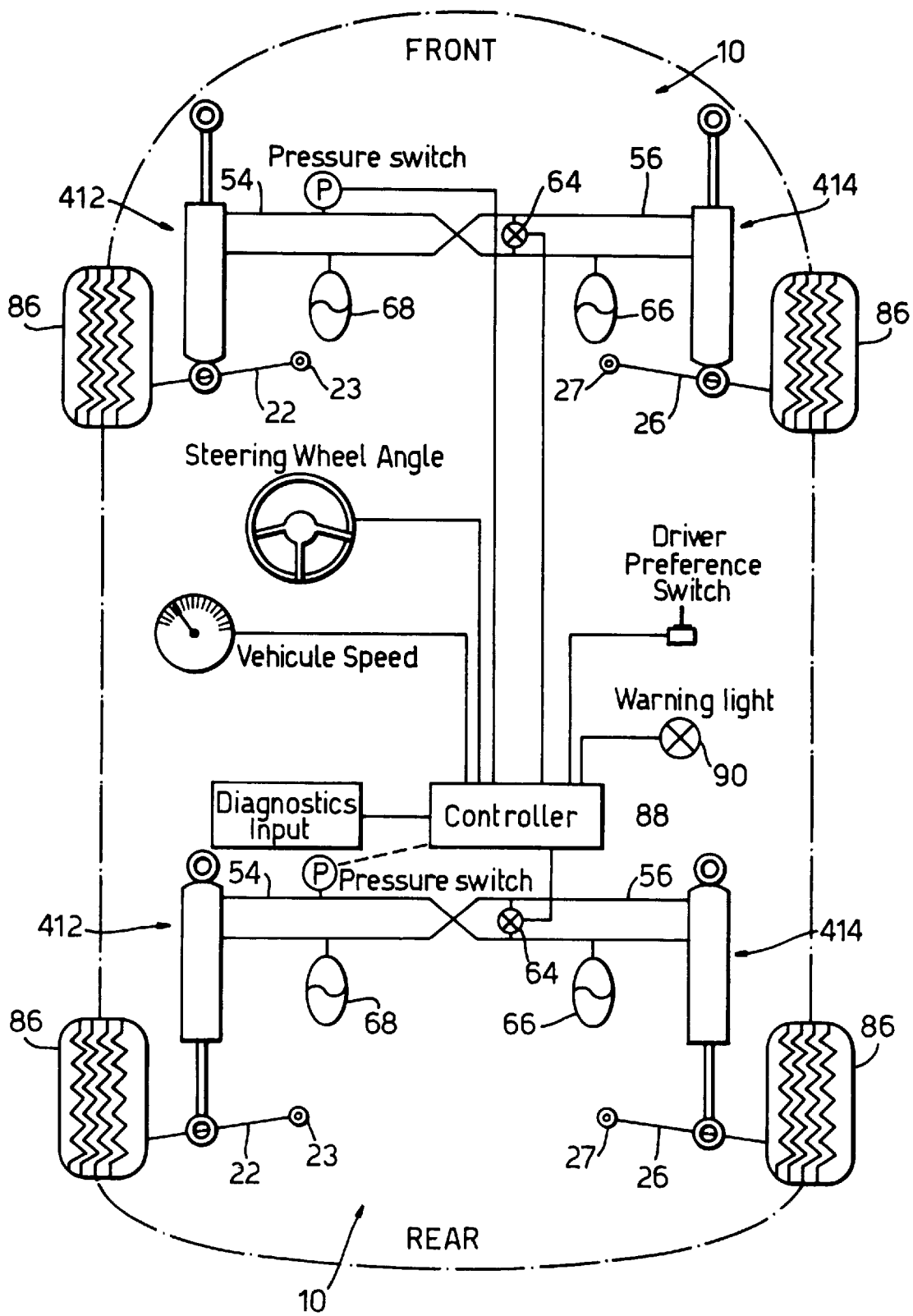
FIG. 13 is a schematic view of a roll control system in accordance with the present invention installed on a motor vehicle.

The roll control system of the present invention is mainly intended for use with the front wheels of a motor vehicle. A similar roll control system may be used solely or additionally with the rear wheels of a motor vehicle. An example of the latter case is illustrated schematically in FIG. 13 using the roll control system 400 of FIG. 11. Operation of the solenoid valves 64 is controlled by an electronic controller 88 which receives input signals providing information on steering wheel angle and vehicle speed, and preferably fluid pressure and possibly a driver preference switch. The controller 88 may also actuate a warning light 90 in the event of a sensed system fault. In a modification to this example, the front and rear roll control systems may be fluidly linked such that the compression chambers 430 of the combined damper and actuators 412 on the left hand side of the vehicle are fluidly connected to each other and to a single accumulator 66, and the compression chambers of the combined damper and actuators 414 on the right hand side of the vehicle are fluidly connected to each other and to a single accumulator 68. Such an arrangement would reduce the number of accumulators required and would substantially prevent any inconsistency in roll moment between the front and the rear of the vehicle.

We claim:

1. A roll control system for a motor vehicle having a vehicle body and a pair of front or rear wheel axles, the roll control system comprising a first fluid damping means pivotally mountable on one wheel axle and mountable between said one wheel axle and the vehicle body; a first fluid actuating means pivotally mountable on said one wheel axle and mountable between said one wheel axle and the vehicle body; a second fluid damping means pivotally mountable on the other wheel axle and mountable between said other wheel axle and the vehicle body; a second fluid actuating means pivotally mountable on said other wheel axle and mountable between said other wheel axle and the vehicle body; wherein the first damping means has a damping and stiffness compression chamber fluidly liked by a first passage to a rebound chamber in the second actuating means; wherein the second damping means has a damping and stiffness compression chamber fluidly linked by a second passage to a rebound chamber in the first actuating means; fluid in the compression chambers, rebound chambers and passages; and fluid pressure control means fluidly connecting the first passage with the second passage or isolating the first passage from the second passage and operable, during predetermined operating conditions of the vehicle, to allow an increase fluid pressure in at least one of the passages to increase roll stiffness, and to allow an increase in roll damping, substantially simultaneously.

2. A roll control system as claimed in claim 1, wherein the fluid pressure control means comprises a first accumulator fluidly connected to the first passage, and a second accumulator fluidly connected to the second passage, the accumulators providing a biasing force to bias the fluid out of the accumulators.

3. A roll control system as claimed in claim 2, wherein the fluid pressure control means further comprises a electrically operated flow control valve which fluidly connects with the first passage and the second passage, the valve either being open to allow fluid to flow between the first and second passages, or the valve being closed during the predetermined operating conditions of the vehicle.

4. A roll control system as claimed in claim 3, wherein the electrically operated flow control valve is a solenoid valve.

5. A roll control system as claimed in claim 4, wherein the accumulators are connected by a floating wall which can move between a pair of stops.

6. A roll control system as claimed in claim 5, wherein each fluid damping means comprises a closed cylindrical housing, a piston sealably slidable in the housing, a piston rod secured to the piston and extending out of the housing, the compression chamber on one side of the piston, a rebound chamber on the other side of the piston, the piston rod extending through the rebound chamber, and a spring biasing the damper to an extended position; and wherein each fluid actuating means comprises a closed cylindrical housing, a piston sealably slidable in the housing, a piston rod secured to the piston and extending out of the housing, a compression chamber on one side of the piston, and the rebound chamber on the other side of the piston, the piston rod extending through the rebound chamber.

7. A roll control system as claimed in claim 5, wherein the first fluid damping means and the first fluid actuating means are integrally formed with a single housing, and wherein the second fluid damping means and the second fluid actuating means are integrally formed with a single housing.

8. A roll control system as claimed in claim 7, wherein the first fluid damping means and the first fluid actuating means have a common compression chamber and a common rebound chamber; and wherein the second fluid damping means and the second fluid actuating means have a common compression chamber and a common rebound chamber.

9. A roll control system as claimed in claim 8, wherein each integrally formed fluid damping means and actuating means comprises the housing; a piston slidably mounted within the housing to define the compression chamber on one side thereof and the rebound chamber on the other side thereof; a rod secured to the piston, extending through the rebound chamber and out of the housing; and a damping valve or orifice between the compression chamber and the fluid passage to which the compression chamber connects.

10. A roll control system as claimed in claim 7, wherein the first fluid damping means and the first fluid actuating means have a common rebound chamber and separate compression chambers; and wherein the second fluid damping means and the second fluid actuating means have a common rebound chamber and separate compression chambers.

11. A roll control system as claimed in claim 10, wherein each integrally formed fluid damping means and actuating means comprises the housing; a piston slidably mounted within the housing to define the compression chamber of the fluid actuating means on one side thereof and the common rebound chamber on the other side thereof; a tubular rod secured to the piston, extending through the rebound chamber and out of one end the housing, and defining internally thereof the compression chamber of the fluid damping means; a rod secured to the other end of the housing and making a sliding fit inside the tubular rod; and a damping valve or orifice between the compression chamber of the fluid damping means and the fluid passage to which the compression chamber connects.

* * * * *